(12) United States Patent
Innocenti

(10) Patent No.: US 7,765,141 B1
(45) Date of Patent: Jul. 27, 2010

(54) ONLINE AUCTION SYSTEM FACILITATING FLEXIBLE TERMS COMMODITY TRADING

(76) Inventor: Tommaso Innocenti, Via Cantagallo 64/I, 59100 Prato (IT)

( * ) Notice: Subject to any disclaimer, the term of this patent is extended or adjusted under 35 U.S.C. 154(b) by 1073 days.

(21) Appl. No.: 09/866,652

(22) Filed: May 30, 2001

(51) Int. Cl.
*G06Q 40/00* (2006.01)
*G06Q 30/00* (2006.01)

(52) U.S. Cl. .......................................... 705/37; 705/26
(58) Field of Classification Search .................. 705/37, 705/22, 23, 30, 81, 80; 702/22, 23, 30, 81
See application file for complete search history.

(56) References Cited

U.S. PATENT DOCUMENTS

| | | | | |
|---|---|---|---|---|
| 4,260,262 | A * | 4/1981 | Webster | 364/418 |
| 6,285,989 | B1 * | 9/2001 | Shoham | 705/37 |
| 6,327,569 | B1 * | 12/2001 | Reep | 705/1 |
| 6,332,135 | B1 * | 12/2001 | Conklin et al. | 705/80 |
| 2001/0032161 | A1 * | 10/2001 | Thomas et al. | 706/36 |
| 2002/0004787 | A1 * | 1/2002 | Moshel et al. | 705/80 |
| 2002/0069156 | A1 * | 6/2002 | Adam et al. | 705/37 |
| 2002/0082982 | A1 * | 6/2002 | Mock et al. | 705/37 |
| 2002/0120555 | A1 * | 8/2002 | Lerner | 705/37 |

OTHER PUBLICATIONS

Dennis L. Prince, Auction This! Your Complete Guide to the World of Online Auctions, 1999, Prima Tech Publishing, pp. 21-23, 63-65, 69, 71-72, 79-81, 85, 98-99, 112-113, 124-125, 166-167, 207-208, 213.*
Peter R. Wurman, William E. Walsh, Michael P. Wellman, Flexible Double Auctions for Electronic Commerce: Theory and Implementation, Dec. 5, 1997, pp. 2-3.*
Roger W. Palmer, Forage Buy-Sell Contracts, UW-Madison Dairy Science Department.*
Peter R. Wurman, William E. Walsh, Michael P. Wellman, The Michigan Internet AuctionBot: A Configurable Auction Server for Human and Software Agents, Summer 1997.*
Pattie Mass, Robert Guttman, Alexandros Moukas, Agents That Buy and Sell, Communications of the ACM, v42n3, Mar. 1999 pp. 81-87.*
Microsoft Press Computer Dictionary, $3^{rd}$ edition, 1997, p. 506.*

* cited by examiner

*Primary Examiner*—Charles R Kyle
*Assistant Examiner*—David L Wood
(74) *Attorney, Agent, or Firm*—Peter Gibson

(57) ABSTRACT

The buying and selling of commodities online in a disciplined manner can be initiated by either a prospective buyer or prospective seller in a variety of auction types each of which supports the negotiation of various terms including payment, delivery, quantity and quality. The initiating party registers as either buyer or seller with a central authority and provides requisite information including commodity specification, which may be qualitative as well as quantitative, and desired delivery terms, which may be specified using formats for several basic options. The type of auction is also specified using an option format beginning with a selection from a plurality of basic types determined by direction of price movement, whether the initiating party is a buyer or seller, and related duration constraints. Sale is determined by acceptance of a bid or offer setting an agreed upon price, quantity, delivery and payment terms. Commodity quality may additionally be negotiated and verification offered by provision of a sample either directly between parties or through the central trusted authority and/or an independent laboratory.

37 Claims, 13 Drawing Sheets

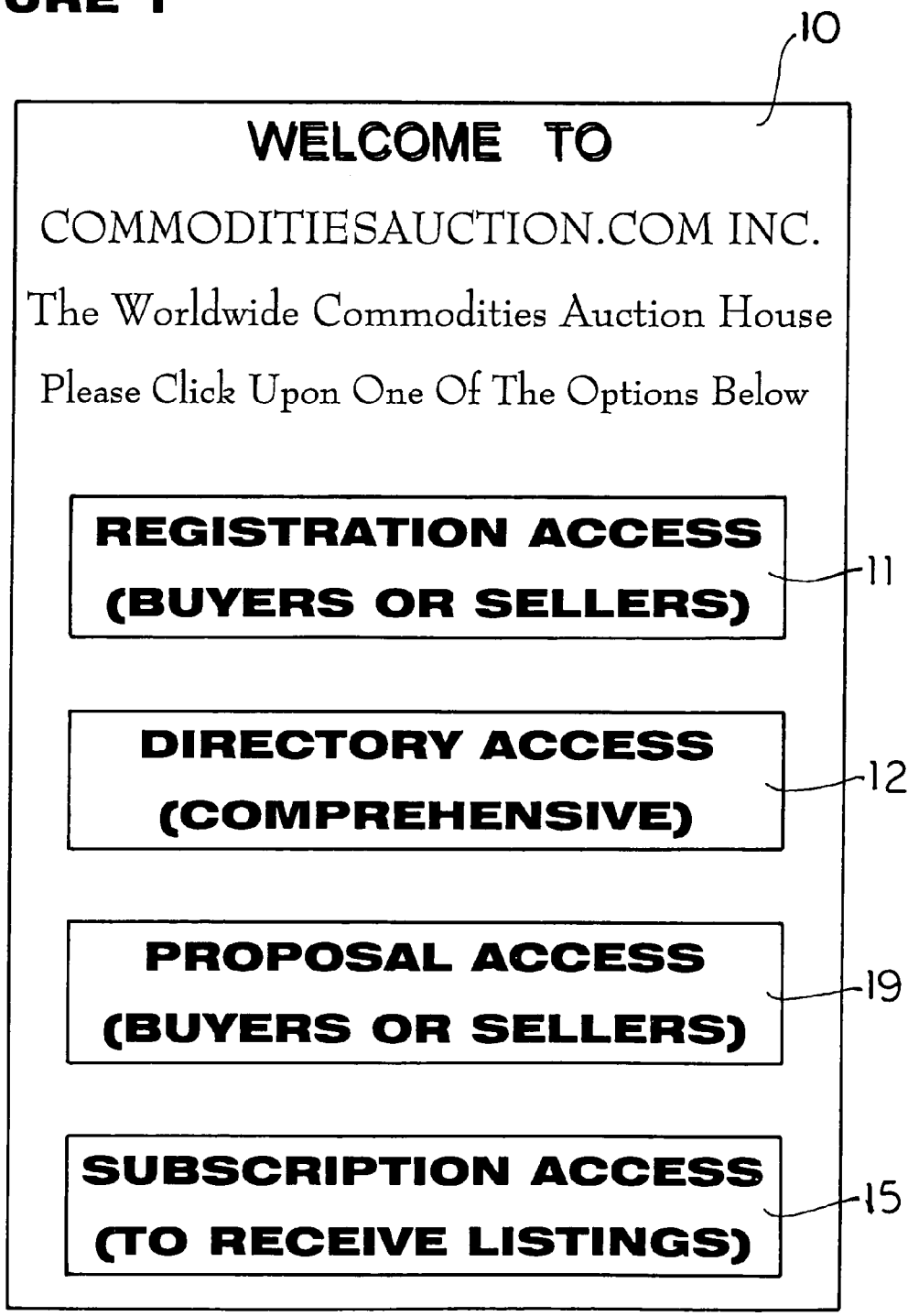

DIRECTORY

Each general category listed alphabetically
below may be selected to obtain a
subdirectory of specific commodity categories

| | | |
|---|---|---|
| ACIDS | BRONZE | CHARCOAL |
| ACRYLICS | BUTYLS | CHLORINATES |
| ALUMINUM | CADMIUM | CHROMIUM |
| AMMONIUM | CALCIUM | CINNAMON |
| ANTIMONY | CAMPHOR | COAL |
| ARSENIC | CARBON | COBALT |
| ASBESTOS | CAROB | COCOA |
| BARIUM | CASSEIN | COCONUT |
| BAUXITE | CASSIA | COLUMBIUM |
| BENZENE | CASTOR | COPPER |
| BERYLLIUM | CELERY | CORK |
| BISMUTH | CELLULOSE | CORN |
| BORON | CERAMICS | COTTON |
| BRASS | CESIUM | CREOSOTE ‒21 |

/ 22

COPPER - ORES

AZURITE (BLUE COPPER CARBONATE, CHESSYLITE)

BORNITE (HORSEFLESH, PEACOCK, VARIEGATED ORE)

CHALCOCITE (CUPROUS SULFIDE)  / 21

CHALCOPYRITE (COPPER PYRITE, YELLOW COPPER ORE)

CUPRITE (RED COPPER ORE, CUPROUS OXIDE)

KUROMONO

MALACHITE (GREEN COPPER ORE)

TENNANITE (GRAY COPPER, TETRAHEDIRITE)

FIGURE 3
⎫ 29

PROPOSAL FORM

OFFER / BID     AUCTION TYPE: _____
(pick one)              (choose from list < >)

COMMENCE: ___ / ___ / ___   ___   CONCLUDE: ___ / ___ / ___   ___
    (day / month / year and preferred hour for auction; GMT)

COMMODITY CATEGORY: _____
                     (choose from directory) ⎫ 25

QUANTITY (available or desired): _____

QUALITY: _____
      (dependent upon commodity category; enter that first)

ORIGIN: _____

LOCATION: _____

DELIVERY DATE (day / month / year): _____

DELIVERY TERMS: _____

PAYMENT TERMS: _____

CURRENCY: _____      PRICE: _____

SAMPLE / MODEL      TESTING: _____
(pick one, both or none)          (yes or no)

DISTRIBUTION: _____
    (direct / thru auction house / proportional or esteemed)

DATE SAMPLE / MODEL AVAILABLE: _____

FIGURE 4

PROPOSAL  /23

52 — OFFER: UPWARD, OPEN, UNCONSTRAINED  /53

COMMENCE: 15 /11 /03 13:00   CONCLUDE: 19 /11 /03 13:00

COMMODITY CATEGORY: COPPER / ORE / CHALCOPYRITE

QUANTITY: 25,000 TONS — 31   \21

ORIGIN: CHILE

LOCATION: SANTIAGO   /30

QUALITY: 5.7% Cu; 1.2% Ag; 0.04% Au
Hardness Variation 0.3 sigma — 35
Density Variation: 0.2 sigma DELIVERY DATE: PICK UP AFTER SALE
                                                                   —32
DELIVERY TERMS: BUYER PAYS FOR SHIPPING

PAYMENT TERMS: 30 DAYS FROM INVOICE   —33

CURRENCY: US DOLLARS PRICE: $300/TON BASE
                                                                   —39

SAMPLE: TEST ONLY TESTING: YES

DISTRIBUTION: N/A

TESTING RESULTS AVAILABLE: 08 /11 / 03 13:00 GMT

FIGURE 5

PROPOSAL

BID: MULTIPARAMETER

COMMENCE: 20/11/01 13:00 GMT  —52

CONCLUDE: 20/11/01  N/A  —53

COMMODITY CATEGORY: WOOL / SCOURED WOOL FLEECES

QUANTITY:   14,000 KG  —31

ORIGIN:   AUSTRALIA

QUALITY:   Fiber Fineness: 22 micron   —35
   Vegetal Matter: 0.3%
   Fiber Length Distribution: see attachment

LOCATION:   LONDON

DELIVERY DATE:   30/11/01   —32

DELIVERY TERMS:   FREE PORT

PAYMENT TERMS:   90 DAYS FROM INVOICE  —33

CURRENCY:   EURO   PRICE:   3.2 / kg  —39

SAMPLE:   AVAILABLE; 1 kg   TESTING: YES

DISTRIBUTION:   THRU AUCTION HOUSE; ESTEEMED

SAMPLE TO BE RECEIVED BY:   30/10/01

FIGURE 7

LISTING  /13

| | |
|---|---|
| BUYING ACTION N. | 003 456 |
| TYPE OF AUCTION | MULTIPARAMETER /21 |
| COMMODITY CAT. | SCOURED WOOL FLEECES |

50 {
- SCHEDULE — Date / Time
- Sample Request By: 10/11/01
- Samples Sent On: 15/11/01  } —55
- Test Results On: 51 { 15/11/01  08:00 GMT
- Auction Starts: 20/11/01  13:00 GMT —52
- Auction Ends: 20/11/01  ---
}
—53

30 {

LOT QUANTITY: 31 —14,000 KG

35 {
- ORIGIN: AUSTRALIA
- FINENESS: 22 MICRONS
- VEGETAL MATTER: 0.3 %
- FIBER LENGTH DIST.: SEE ATTACHMENT
}

32 {
- DELIVERY TAKEN IN: LONDON
- DELIVERY DATE: 30/11/01
- DELIVERY TERMS: FREE PORT
}

33 {
- PAYMENT TERMS: 90 DAYS FROM INVOICE
- PRICE: 39 / 3.2 EUROS / KG
}

}

LAST UPDATE: 14/09/01  15:58

FIGURE 8

OFFERINGS & INDICATIONS

| | 17 | 26 | | 26 | |
|---|---|---|---|---|---|
| | OPEN BID | OFFER # 1 | INDICATIONS | OFFER # 2 | INDICATIONS |
| QUANTITY | 14,000 KG | 14,000 KG | | 20,000 KG | |
| ORIGIN | AUSTRALIA | AUSTRALIA | | AUSTRALIA | |
| FINENESS | 22 MICRONS | 21.8 MICRONS | | 22.5 MICRONS | |
| VEGETAL | 0.3 % | 0.3 % | | 0.4 % | |
| FIBER DST | ATTACHMENT | ATTACHMENT | | ATTACHMENT | |
| DELIVERY | LONDON | LONDON | | LONDON | |
| TERMS | FREE PORT | FREE PORT | | FREE PORT | |
| PAYMENT | 90 INVOICE | 30 INVOICE | | LTR OF CREDIT | |
| PRICE | 3.2 EU/KG | 3.4 EU/KG | | 3.1 EU/KG | |
| LAST UPDATE | 14/09/01 15:58 GMT | 20/11/01 13:00 GMT | | 20/11/01 13:10 GMT | |

FIGURE 9

OFFERINGS & INDICATIONS

| | 17 | 26 | 37 | 26 | 37 |
|---|---|---|---|---|---|
| | OPEN BID | OFFER # 1 | INDICATIONS | OFFER # 2 | INDICATIONS |
| QUANTITY | 14,000 KG | 14,000 KG | | 20,000 KG | |
| ORIGIN | AUSTRALIA | AUSTRALIA | | AUSTRALIA | |
| FINENESS | 22 MICRONS | 21.8 MICRONS | | 22.5 MICRONS | |
| VEGETAL | 0.3 % | 0.3 % | | 0.4 % | |
| FIBER DST | ATTACHMENT | ATTACHMENT | | ATTACHMENT | |
| DELIVERY | LONDON | LONDON | | LONDON | |
| TERMS | FREE PORT | FREE PORT | | FREE PORT | |
| PAYMENT | 90 INVOICE | 30 INVOICE | 60 INVOICE | LTR OF CREDIT | COD   27 |
| PRICE | 3.2 EU/KG | 3.4 EU/KG | 3.35 EU/KG | 3.1 EU/KG | 2.95 EU/KG |
| LAST UPDATE | 14 /09 /01 15:58 GMT | 20 /11 /01 13:00 GMT | 20 /11/ 01 13:20 GMT | 20 /11 /01 13:10 GMT | 20 /11 /01 13:20 GMT |

FIGURE 10

OFFERINGS & INDICATIONS

| | | 26 | 37 | 26 | 37 |
|---|---|---|---|---|---|
| | OPEN BID | OFFER # 1 | INDICATIONS | OFFER # 2 | INDICATIONS |
| QUANTITY | 14,000 KG | 14,000 KG | | 20,000 KG | |
| ORIGIN | AUSTRALIA | AUSTRALIA | | AUSTRALIA | |
| FINENESS | 22 MICRONS | 21.8 MICRONS | | 22.5 MICRONS | |
| VEGETAL | 0.3 % | 0.3 % | | 0.4 % | |
| FIBER DST | ATTACHMENT | ATTACHMENT | | ATTACHMENT | |
| DELIVERY | LONDON | LONDON | | LONDON | |
| TERMS | FREE PORT | FREE PORT | | FREE PORT | |
| PAYMENT | 90 INVOICE | 30 INVOICE | 45 INVOICE | LTR OF CREDIT | COD |
| PRICE | 3.2 EU/KG | 3.4 EU/KG | 3.35 EU/KG | 3.0 EU/KG | 2.95 EU/KG |
| LAST UPDATE | 14 /09 /01 | 20 /11 /01 | 20 /11/ 01 | 20 /11 /01 | 20 /11 /01 |
| | 15:58 GMT | 13:30 GMT | 13:40 GMT | 13:40 GMT | 13:30 GMT |

FIGURE 11

OFFERINGS & INDICATIONS

| | 17 | 26 | 37 | | |
|---|---|---|---|---|---|
| | OPEN BID | OFFER # 1 | INDICATIONS | OFFER # 2 | INDICATIONS |
| QUANTITY | 14,000 KG | 14,000 KG | | 20,000 KG | |
| ORIGIN | AUSTRALIA | AUSTRALIA | | AUSTRALIA | |
| FINENESS | 22 MICRONS | 21.8 MICRONS | | 22.5 MICRONS | |
| VEGETAL | 0.3 % | 0.3 % | | 0.4 % | |
| FIBER DST | ATTACHMENT | ATTACHMENT | | ATTACHMENT | |
| DELIVERY | LONDON | LONDON | | LONDON | |
| TERMS | FREE PORT | FREE PORT | | FREE PORT | |
| PAYMENT | 90 INVOICE | 30 INVOICE | 30 INVOICE | LTR OF CREDIT | COD |
| PRICE | 3.2 EU/KG | 3.35 EU/KG | 3.35 EU/KG | 3.0 EU/KG | 2.95 EU/KG |
| LAST UPDATE | 14 /09 /01 | 20 /11 /01 | 20 /11 /01 | 20 /11 /01 | 20 /11 /01 |
| | 15:58 GMT | 13:30 GMT | 13:50 GMT | 13:40 GMT | 13:30 GMT |

PROPOSAL

OFFER: UNIPARAMETER PROGRESSIVE DECREASE —16

COMMENCE: 15 /01 /02 13:00 GMT    CONCLUDE: 15 /01 /02  - - GMT

COMMODITY CATEGORY: WOOL / SCOURED WOOL FLEECES

QUANTITY :        14,000 KG

ORIGIN:           AUSTRALIA

LOCATION:         LONDON

QUALITY:          22 MICRON FIBER FINENESS
                  0.3 % VEGETAL MATTER
                  FIBER LENGTH DISTRIBUTION ATTACHMENT

DELIVERY DATE:    30 /11 /01

DELIVERY TERMS:   FREE PORT

PAYMENT TERMS:    CASH ON DELIVERY

CURRENCY: EURO    PRICE: 3.6 / KG

SAMPLE:    1 KG        TESTING: YES

DISTRIBUTION:          DIRECT; PROPORTIONAL

SAMPLE TO BE RECEIVED BY: 30 /10 / 01

LISTING

/16

| | |
|---|---|
| SELLING ACTION N. | 003 457 |
| TYPE OF AUCTION | UNIPARAMETER PROGRESSIVE DECREASE |
| COMMODITY CAT. | SCOURED WOOL FLEECES |
| SCHEDULE | Date    Time |
| Sample Request By: | 10 /11 /01 |
| Samples Sent On: | 15 /11 /01 |
| Test Results On: | 15 /11 /01  08:00 GMT |
| Auction Starts: | 20 /11 /01  13:00 GMT |
| Auction Ends: | 20 /11 /01  --- |
| | |
| LOT QUANTITY: | 14,000 KG |
| ORIGIN: | AUSTRALIA |
| FINENESS: | 22 MICRONS |
| VEGETAL MATTER: | 0.3 % |
| FIBER LENGTH DIST.: | SEE ATTACHMENT |
| | |
| DELIVERY TAKEN IN: | LONDON |
| DELIVERY DATE: | 30 /11 /01 |
| DELIVERY TERMS: | FREE PORT |
| PAYMENT TERMS: | CASH ON DELIVER |
| STARTING PRICE: | 3.6 EUROS / KG |
| MINIMUM PRICE: | UNSPECIFIED |
| | |
| LAST UPDATE: | 14 /09 /01  15:58 |

ONLINE AUCTION SYSTEM FACILITATING FLEXIBLE TERMS COMMODITY TRADING

BACKGROUND OF THE INVENTION

1. Field of the Invention

The present invention relates generally to data processing in cost/price determination, more particularly to an automated electrical financial business practice or management arrangement utilizing data processing in cost/price determination, and most specifically to such a business practice or management arrangement for the conduct of commodity trading utilizing an auction format in which bidding is conducted online.

2. General Background

Online auctions of various descriptions have recently obtained considerable success consequent the development of the internet infrastructure and its popularization through the world wide web (www) network linking personal and other computers through web sites accessible online, i.e. through the www, which are comprised of software maintained by a server computer and are identified by domain names which constitute the basic www address utilized to access the same.

One such online auction, ostensibly the most widely used and known at present, simply permits the representation of goods to be sold by a private party and the entrance of bids by prospective buyers enabling the seller to select the high bid and arrange for delivery. A fee is charged from the seller upon whom the buyer is dependent for delivery without further involvement by the auction house. This online auction is considered particularly successful because the auction house has severely limited liability and cannot lose money so long as the fee charged exceeds the cost of hosting the seller's data upon its server computer. This system relies upon a grading system which is facilitated by the auction house but conducted by the system users who provide comment upon previous dealings with the seller and in which a new seller has no grade.

This type of online auction is considered appropriate for the trading of collectibles which encompasses a wide variety of goods but which is characterized by the type of good concerned: coins, musical recordings, antique dolls or toys, et cetera. The range is limited to collectibles as necessary to provide the self policing required to deter fraud as the auction house assumes essentially no liability for misrepresentation or non-delivery. This type of auction is not appropriate for commodities which are considered to possess several obvious and fundamental differences with the trading of collectibles: collectibles are discrete items while commodities are not; collectibles are bought to be held and/or sold again while commodities are used as material in the production of finished product; collectibles are sold by the piece while commodities are sold by weight and quality.

These distinctions are considered to distinguish the trading of commodity over the trading of all finished goods inclusive of new product sold over what is ostensibly the second largest known online auction. The difference between a commodity and finished goods, new or previously owned, is considered fundamental and only online auction systems facilitating the trading of commodities are considered to comprise prior art pertinent to the present invention. Prior art relating to online auctioning of financial instruments is similarly excluded by the basic distinction over the same provided by the physical nature of commodity.

References Cited

| U.S. Pat. # | Inventor | Date | Title |
| --- | --- | --- | --- |
| 4,677,552 | Sibley, Jr. | 30 Jun. 1987 | International Commodity Trade Exchange |
| 5,168,446 | Wiseman | 1 Dec. 1992 | System For Conducting And Processing Spot Commodity Transactions |
| 5,715,402 | Popolo | 3 Feb. 1998 | Method And System For Matching Sellers And Buyers Of Spot Metals |
| 5,835,896 | Fisher et al. | 10 Nov. 1998 | Method And System For Processing And Transmitting Electronic Auction Information |
| 5,950,178 | Borgato | 7 Sep. 1999 | Data Processing System And Method For Facilitating Electronic Auction Information |
| 6,151,589 | Aggarwal et al. | 21 Nov. 2000 | Methods For Performing Large Scale Auctions And Online Negotiations |

Discussion of the References Cited

Sibley, Jr. discloses an 'international commodity exchange' which combines local trading exchanges located in at least two different countries with a computer network which provides current trading data from a 'central exchange host' to the local exchanges and to a number of 'user computer terminals' which subscribe to the local exchange but receive information directly from the central host and which may "transmit data representing bids and offers to any other user terminal around the world and through the local exchanges and the host exchange" (Abstract). The local exchanges must facilitate "computerized trades in markets such as the futures markets, cash market, oil market, stock market, and the securities market" (claim 1) but trading in commodities is also disclosed (claims 8 & 9, various drawing figures).

Wiseman discloses a system for trading commodities by subscribers each possessing a 'trading station' "electronically coupled to (the) system to form a network" (claim 1), each 'trading station' possessing all the means necessary to: display and input data; communicate; transmit a "trading quotation request signal"; decline quotation or transmit "a quotation signal setting forth a bid price and an offer price for the identified commodity, and optionally a volume amount"; receive the quotation; send back a proposal in accordance with the bid or offer terms; receive the proposal; accept a proposal "setting forth a volume amount for the transaction"; and acknowledgement of the acceptance, by alternate parties and with the latter steps or 'means' being dependent upon the preceding step or 'means'.

Popolo discloses a "computerized method of assisting remote users in the process of buying and selling spot metals" (claim 1) which automatically converts "dimensions and asking price data entered by a seller to the preferred units of measure of a prospective buyer". This requires first "storing preferred units for each user", sending a data entry form to a seller including commodity type, metal dimension, and asking price, "modifying said form to display a set of attributes uniquely associated with the commodity selected by the seller", storing this data, and after converting into the preferred units, sending a "non-editable version of said entry form" to the buyer. Entrance of a bid by a buyer to the seller and response by the seller to the buyer via electronic mail is also disclosed.

Fisher et al. disclose "an auction information transmission and processing system implemented as a computer program within said host and network" (claim 1) including a 'merchandise database' with information "descriptive of a lot available for purchase by a customer", a 'bid database' with "information descriptive of a bid", 'an auction manager' in communication with the databases, and an associated 'bid validator' which receives bids. The auction manager posts a "descriptive merchandise database" and receives bids which are validated and determines whether each bid is successful. The 'auction manager' may also use a set time to open a lot to bids and 'adjust' the information in the merchandise database by setting a minimum price for a lot.

Borgato discloses a "system for listing and facilitating transactions involving stones categorized by weight and at least one other characteristic relating to the gem" comprising: a 'host processor' with a 'data structure' for each stone comprised of weight, the characteristic, offer price, and seller ID which arranges the data into a matrix array of categories with automatic comparison yielding the lowest offer price for a category and moving the same into "a primary offer position in the array category"; "a plurality of remote terminals each including a display"; "a data link between said terminals to said host processor" (claim 1); and various means necessary for communication, bidding, and effecting sales whereby the buyer and seller are informed and the stone is removed from the array.

Aggarwal et al. disclose a "method for conducting continuous auctions . . . over a computer network . . . comprising the following steps:"

communicating seller information including an estimated time interval to the next auction decision;

accepting buyer information . . . including a bid price, a bid entry time, a bid duration, and an intended purchase volume; and dynamically scheduling a next auction through determining a response time . . . said scheduling (being) adjusted in a manner such that buyers are retained in said auction for as lon(g) as (p)possible (claim 1) to which various options are appended and which is essentially repeated in independent claim 17 for a 'computer program device' and which is again repeated in independent form in claim 33 including several of the options, i.e. "ascertaining all said buyers for whom said bid price is higher than said asking price" and "adjusting successive estimated time intervals . . . to retain (these) buyers" and "dynamically selecting at least one auction winner" which is further refined and also repeated in independent claim 48 for a "computer program device", along with repetition of the refinements. A heavy reliance upon the step of "dynamically scheduling a next auction . . . " is observed as this step alone distinguishes the innovation over the prior art and is also the basis for the more detailed system claimed in four different but essentially repetitive sets of claims.

In summary, the prior art is seen to disclose various computer data systems intended to facilitate the making of markets and trading of commodities generally, and specifically including steel, gemstones, and bales of cotton. A system which automatically adjusts in order to retain buyers in the auction for as long as possible is disclosed. Use of regular and reverse auctions are disclosed as is the use of an array for organizing information about a commodity including 'special characteristics'. Use of subscriber, network, and Internet communications systems are disclosed. Provision for electronic transfer of title is disclosed. Provision for negotiation between buyer and seller via counter offers is disclosed. And the volume, price, and locations involved are all utilized as data transferred between parties.

Statement of Need

The prior art does not disclose an auction system providing a choice between auction types nor a choice between at least three types of payment and does not specify terms regarding delivery in association with the terms of payment. While incremental auctioning is considered known the choice of 'English' or 'Dutch', i.e. upward or downward bidding, together with the choice between incremental or open bidding is unknown. The prior art discloses neither receipt and provision of physical specimens though representation and verification by various means are encompassed. The prior art does not disclose the independent testing of specimens for representation of data and does not disclose use of characteristics appropriate to various commodities, organic and inorganic, and does not encompass multiple sets of characteristics appropriate to a plurality of particular commodities.

The failure of the prior art to provide an online auction system for commodities which is flexible with regard to the commodity addressed, the type of auction, and the construction of terms from several different options inclusive of both delivery and payment, and the failure to provide for authentication of commodity by sample provision or sample testing is considered to present a distinct and poignant need for an online auction system which provides multiple options with regard to: the type of auction; the particular commodity; construction of terms for delivery and payment; verification of product quality by sample provision or testing; and characteristics selectable in description of particular commodities.

SUMMARY OF THE INVENTION

Objects of the Invention

The encompassing objective of the principles relating to the present invention is the provision of an online auction system suited to the trading of commodities which is flexible with regard to auction parameters.

A first auxiliary objective of the principles relating to the present invention is the provision of an online auction system suited to the trading of commodities which is flexible with regard to the type of auction.

A first ancillary objective of the principles relating to the present invention is the provision of an online auction system suited to the trading of commodities which is flexible with regard to the bidding direction.

A second ancillary objective of the principles relating to the present invention is the provision of an online auction system suited to the trading of commodities which is flexible with regard to the initiator as buyer or seller.

A third ancillary objective of the principles relating to the present invention is the provision of an online auction system suited to the trading of commodities which is flexible with regard to open or incremental bidding.

A second auxiliary objective of the principles relating to the present invention is the provision of an online auction system suited to the trading of commodities which is flexible with regard to the terms governing sale.

A fourth ancillary objective of the principles relating to the present invention is the provision of an online auction system suited to the trading of commodities which is flexible with regard to terms governing delivery.

A fifth ancillary objective of the principles relating to the present invention is the provision of an online auction system suited to the trading of commodities which is flexible with regard to terms governing payment.

A third auxiliary objective of the principles relating to the present invention is the provision of an online auction system suited to the trading of commodities which is flexible with regard to description of commodity quality.

A sixth ancillary objective of the principles relating to the present invention is the provision of an online auction system suited to the trading of commodities which is flexible with regard to the type of commodity in providing multiple sets of characteristics each appropriate to the description of quality of a particular commodity.

A seventh ancillary objective of the principles relating to the present invention is the provision of an online auction system suited to the trading of commodities which is flexible with regard to initiator in specification of quality.

A fourth auxiliary objective of the principles relating to the present invention is the provision of an online auction system suited to the trading of commodities which is flexible with regard to verification of commodity quality.

An eighth ancillary objective of the principles relating to the present invention is the provision of an online auction system suited to the trading of commodities which facilitates the provision of commodity specimens.

A ninth ancillary objective of the principles relating to the present invention is the provision of an online auction system suited to the trading of commodities which provides independent laboratory commodity specimen analysis in data available pertaining to commodity quality.

A tenth ancillary objective of the principles relating to the present invention is the provision of an online auction system suited to the trading of commodities which facilitates the provision of models of the commodity desired Principles Relating to the Present Invention In fulfillment of the objectives stated above it is considered that a variety of recognizable auction parameters may be presented in the form of alternative options in the tailoring of the auction to the commodity concerned, related particulars, and participant preference. It is first considered that the system must be comprehensive of a plurality of different types or sorts of commodities and that secondly the attributes utilized in specification must be variable with respect to various commodities in order to provide for specification of quality in terms appropriate to each commodity.

Quality is a universal but the manner of measuring the same is often particular to the type of commodity and is preferably inclusive of qualitative as well as quantitative modes. The terms of delivery and payment are often associated with the type of commodity and the provision of appropriate options as well as negotiation of those options by prospective buyers and sellers is similarly desirable. The type of auction itself is another parameter which may be varied to facilitate the particular type of commodity involved. The direction of bidding, upward or downward, and the mode, incremental or open, may be selected by an initiator of a bid or offer thereby providing a single online auction system which is comprehensive of all commodity trading and capable of customization by the participants as appropriate to the particular commodity concerned as well as to particular participant preferences.

In support of quality verification it is specifically suggested that commodity sample provision be facilitated whereby a prospective seller provides a sample, preferably to the auction house or independent laboratory but alternatively to buyers directly, and that the auction house provide objective testing of the sample provided, preferably by an independent laboratory, and post these results in the commodity auction listing concerned. Qualitative characteristics may also be evaluated by an independent expert or by the buyer in the case of provision of sample to the same. Description of the commodity quality in both quantitative and qualitative aspects by the prospective buyer is also suggested wherein a model of the desired commodity of a desired quality is provided to the prospective sellers.

The terms of delivery and payment are options available for negotiation as well. Both the prospective seller and the prospective buyer may select preferred terms of delivery and payment. Terms regarding delivery and payment as well as price, volume, and quality can be negotiated during an auction which is concluded by the agreement on terms between buyer and seller or expiration of a time limit resulting in withdrawal of the offer or bid. Both prospective buyer and seller may set time limits, respectively, on each offer or bid. The matching of terms, moreover, may be automatically recognized by the auction house without prior recognition by the two parties concerned. A prospective buyer or seller may either enter, respectively, a new bid or offer or modify an existing one without recognizing that this matches an offer or bid new or outstanding. The auction house must provide the structure for a forum open to registrants and does not need to be involved with transactions concluded other than in providing all the current requisite information accurately which responsibility may be left largely to the participants but which responsibility is preferably shared by the auction house to the extent of accurately posting offers and bids and de-posting the same when matched or expired.

In addition to this updating of a website to which registrants with the auction house have access it is suggested that the auction house utilize electronic mail (e-mail) to inform participants of new postings, either received from the participant or pertaining to a participant's outstanding offer or bid or indication of interest, in receipt of such postings. The updated web site can be relied upon for this, or e-mail, or facsimile transmission, or personal telephone calls, or short message system (SMS) messages which appear on the display screen of a portable electronic reception device such as a cell phone. A trader in copper ore may like to receive, and pay for the provision of, both new offers and bids concerning copper ore for example while a buyer of raw material for clothing may have no interest in any type or ore of much particular interest in new bids for as opposed to new offers of wool and cotton, for another example, though it is recognized that both buyers and sellers likely have an interest in both bids and offers concerning a given commodity as a means of tracking the market for the same. A buyer with very particular demands for quality or other characteristics which are not generally available may prefer to leave an open bid and while possibly possessing curiosity about other bids is surely most interested in receiving notification of a matching offer as soon as possible.

Other advantages and benefits to be realized in fulfillment in the principles relating to the present invention may be appreciated with a reading of the detailed discussion below, especially if made with reference to the drawings attached hereto, further briefly described immediately following.

BRIEF DESCRIPTION OF THE DRAWINGS

FIG. 1 is a sample representation of an entrance page to an auction house web site facilitating flexible terms commodity trading online in accordance with the principles relating to the present invention.

FIG. 2 is a sample representation of a directory of commodity categories maintained by an auction house web site facilitating flexible terms commodity trading online in accordance with the principles relating to the present invention.

FIG. 3 is a sample representation of a proposal format to be completed by a prospective buyer or seller of a lot in auction in submission of, respectively, an bid or offer, to an auction house web site facilitating flexible terms commodity trading online in accordance with the principles relating to the present invention.

FIG. 4 is a sample representation of a completed proposal by a seller for a simple English auction of a lot of copper submitted to an auction house web site facilitating flexible terms commodity trading online in accordance with the principles relating to the present invention.

FIG. 5 is a sample representation of a completed proposal by a buyer for a multiparameter auction lot of wool submitted to an auction house web site facilitating flexible terms commodity trading online in accordance with the principles relating to the present invention.

FIG. 7 is a sample representation of a lot listing reflecting the proposal by a buyer in FIG. 6 by an auction house web site facilitating flexible terms commodity trading online in accordance with the principles relating to the present invention.

FIG. 8 is a sample representation of the a lot listing in FIG. 7 by an auction house web site facilitating flexible terms commodity trading online in accordance with the principles relating to the present invention reflecting the addition of two counter offers.

FIG. 9 is a sample representation of the lot listing in FIG. 8 by an auction house web site facilitating flexible terms commodity trading online in accordance with the principles relating to the present invention reflecting the addition of indications by the initiator in response to the two counter offers.

FIG. 10 is a sample representation of the lot listing in FIG. 9 by an auction house web site facilitating flexible terms commodity trading online in accordance with the principles relating to the present invention reflecting modification of a counter offer.

FIG. 11 is a sample representation of the a lot listing in FIG. 10 by an auction house web site facilitating flexible terms commodity trading online in accordance with the principles relating to the present invention reflecting the selection of a winning counter offer.

FIG. 12 is a sample representation of a proposal by a seller for a uniparameter progressive decrease auction of a lot of wool submitted to an auction house web site facilitating flexible terms commodity trading online in accordance with the principles relating to the present invention.

FIG. 13 is a sample representation of a lot listing reflecting the proposal by a seller in FIG. 12 by an auction house web site facilitating flexible terms commodity trading online in accordance with the principles relating to the present invention.

NOMENCLATURE

Figure 6:
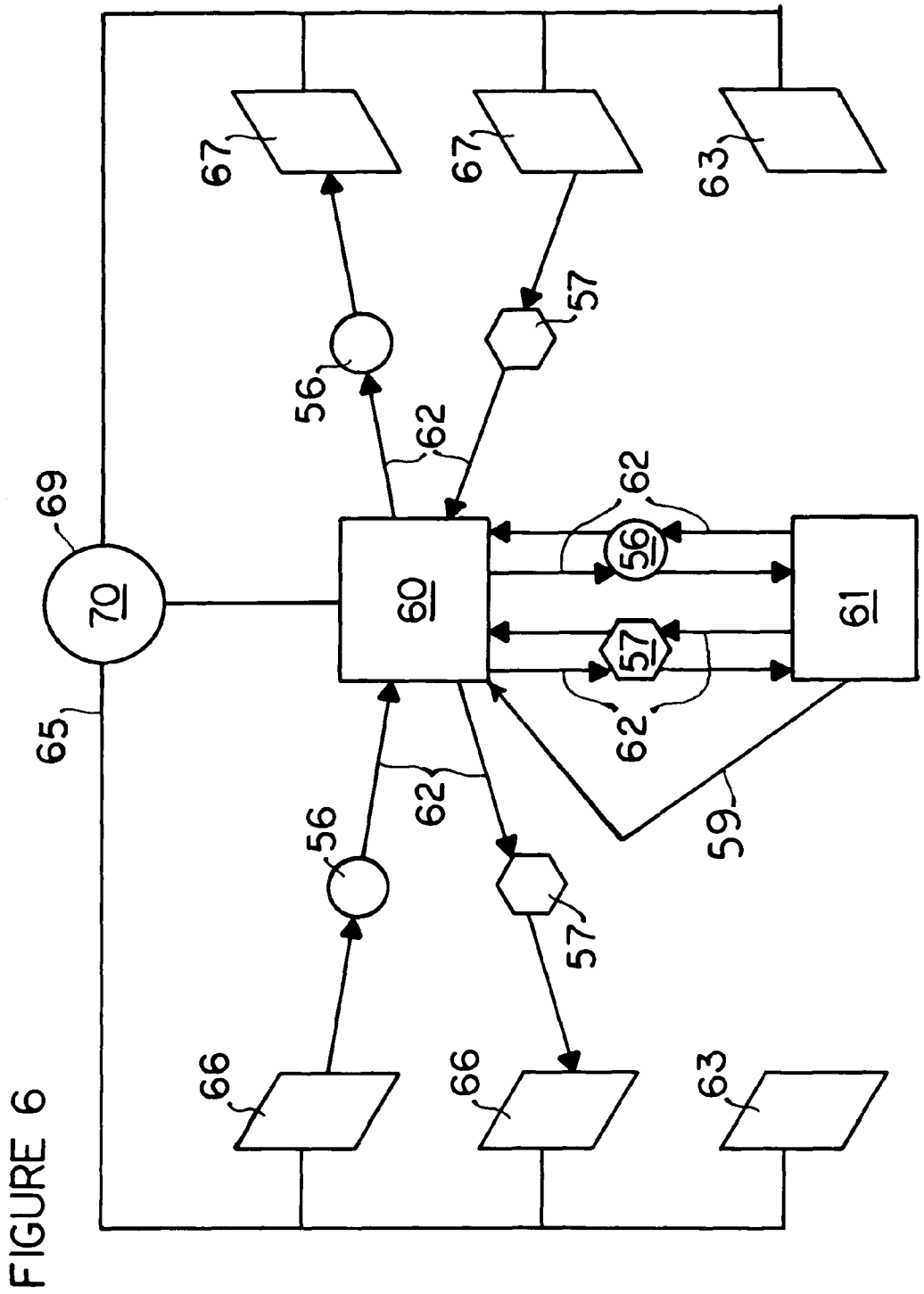
FIG. 6 is a schematic representation of the exchange of samples and models between participants and the online auction house and of the interne connection between the same.

| | |
|---|---|
| 10 | web page |
| 11 | registration access means |
| 12 | directory access means |
| 13 | listing |
| 15 | subscription access means |
| 16 | open offer |
| 17 | open bid |
| 19 | proposal access means |
| 20 | directory |
| 21 | commodity category |
| 22 | subdirectory |
| 23 | proposal |
| 25 | entry field |
| 26 | counter offer |
| 27 | counter bid |
| 29 | proposal format |
| 30 | terms |
| 31 | quantity |
| 32 | delivery terms |
| 33 | payment terms |
| 35 | quality specification |
| 36 | offer indication |
| 37 | bid indication |
| 39 | price indication |
| 50 | scheduling |
| 51 | schedule dates |
| 52 | commencement |
| 53 | conclusion |
| 55 | sample dates |
| 56 | sample |
| 57 | model |
| 59 | test results |
| 60 | auction house |
| 61 | laboratory |
| 62 | commercial transport |
| 63 | registrant |
| 65 | internet |
| 66 | prospective seller |
| 67 | prospective buyer |
| 69 | server computer |
| 70 | web site |

DETAILED DESCRIPTION OF THE PREFERRED EMBODIMENT

With reference to FIGS. 1 & 6 it is first considered that the user of a system in accordance with the present invention may visit a web site 70 maintained by an auction house 60 facilitating online auction of commodities possessing a web page 10 possessing registration access means 11 for registration with the system and further providing directory access means 12 to a directory 20, as depicted in FIG. 2, of commodities encompassed by the system which may be restricted in access to registrants or not as desired and which provides access to individual listings 13, as depicted in FIGS. 7-11 & 13 comprised of open offers 16 and open bids 17 for a specified lot of a particular commodity.

The business method presented herein is intended to operate at a profit and it is recommended that fees be charged for registration and subscription. In addition or alternatively, however, it is suggested that fees be charged of either the prospective seller 66 and or prospective buyer 67 only in consequence of a sale in which case the fee may readily be assessed as a percentage thereof and no registration or subscription fees are necessary. Registration, moreover, may be required only of prospective sellers 66 in which case access to the listings 13 is preferably gained directly through the directory 20 by selecting a particular commodity category 21 which is inclusive of at least one specific commodity. It is also preferred that listings 13 pertaining to a particular area of interest including selection of at least one particular specific commodity category 21, as seen in FIG. 2, be directly sent via e-mail to subscribers for this service which preferably requires registration and payment.

Subscription access means 15 are hence preferably available, as depicted in FIG. 1, on a web page 10 of the web site 70, represented in FIG. 6, maintained by the auction house facilitating online flexible terms commodity auctions in accordance with the principles relating to the present invention. Listings 13 and/or other data other are preferably accessible only to registrants 63 or subscribers which are, for purposes of simplicity, encompassed by registrants 63 in the representation of the system or business arrangement represented in FIG. 6.

Someone interested in placing an open offer 16 for a lot of copper ore, for example, in order to complete a proposal 23 as depicted in FIG. 4, might first go to the web page 10 represented in FIG. 1 and select the directory access means 12 leading to a directory 20 such as that depicted in FIG. 2 which might either have copper or ore as a commodity category 21 which might further lead to a subdirectory 22, such as the one entitled 'COPPER-ORES' further seen in FIG. 2, which contains the specific commodity category 21 'CHALCOPYRITE' as seen therein which selection yields access to the listings 13 current for this exemplary specific commodity category 21 and which additionally might provide access to the execution of a proposal 23 such as those depicted in FIGS. 4 & 5 for the entrance of an open offer 16 or open bid 17 for a lot of copper ore which is preferably first compared by the system with any listing 13 containing outstanding open bids 17 or offers 16 in order to identify matches meeting or near matches nearly meeting the terms 30 set forth prior to creation of a new listing 13.

Alternatively to going through the directory 20 and identifying a particular specific commodity category 21 as a means of gaining access to the execution of a proposal 23 this access may be provided directly by selecting proposal access means 19 as depicted in FIG. 1 which would yield a proposal format 29, as seen in FIG. 3, for completion in entrance of a proposal 23. In this case the specific commodity category 21 must be entered while this would preferably be automatically entered by the system in the case described above wherein the proposal access means 19 includes the directory 20. Other entry fields 25 in the proposal format 29 may also be automatically entered by the system dependent upon previously entered information.

The entry field 25 for bid/offer, for example, could be previously determined by splitting the proposal access means 19 into two: bid or offer, i.e. buy or sell. And most of the other entry fields 25 represented including those for currency, location, and other delivery terms 32 and payment terms 33, might be default selections which are automatically entered by the system upon recognition of a registrant's identity, if desired. Entry fields 25 for quantity 31, final use, origin, type of auction, and most particularly, price 39, are generally expected to require entry of information in completion of the proposal 23 as necessary for entrance of the same resulting in a new listing 13. But not every entry field 25 seen in the proposals 23 or proposal format 29 depicted in FIGS. 3, 4, 5 & 12 is necessary nor, moreover, are the fields seen therein considered to be complete with regard to all the entry fields 25 which might be useful in the definition of a new listing 13. The proposals 23 and the proposal format 29 depicted are exemplary with regard to the approach of a preferred embodiment of the principles relating to the present invention wherein flexibility with regard to all aspects of commodity trading online is facilitated. Many of the entry fields 25 depicted consist of multiple options which define a flexible but disciplined platform for the conduct of online commodity auction.

The proposal format 29 depicted in FIG. 3 is less detailed than the proposals 23 depicted in FIGS. 4, 5 & 12 and is representative of a generic proposal format 29 which, with specification of the specific commodity category 21, is preferably expansible to include other, or modify existing, entry fields 25. The proposal format 29 depicted has only one entry field 25 for quality specification 35 other than origin while both the completed proposals 23 reflect use of multiple entry fields 25 for quality specification 35: percentage Cu, Au & Ag as well as hardness and density variation in the case depicted for chalcopyrite, which is the most widely traded type of copper ore, and fiber fineness, percentage vegetal matter, and fiber length distribution for scoured wool fleeces, which is the most commonly traded type of wool. The origin is considered a basic general indicator of quality useful for virtually any commodity.

Quality is considered to be comprised of different characteristics dependent upon the specific commodity category 21 concerned. Copper ore and wool are merely chosen as examples which emphasize this observation. One might suppose that quantity 31, price 39, and identification of the specific commodity category 21 would be sufficient but quality remains, in contrast to identification, a largely subjective determination for which reason it is considered desirable in many cases to provide the prospective buyer 67 with a sample 56, as schematically represented in FIG. 6, preferably obtained from a prospective seller 66 via the online auction house 60 as depicted therein but which optionally might be directly provided by a prospective seller 66 to prospective buyer 67. Testing by an independent laboratory 61 will enable posting of test results 59, i.e. quantitative data regarding quality, which can supplant sample 56 provision. Qualitative data can also be provided in the form of photographs or other graphic attachments accessible from the listing 13 or in the samples 56 provided to a prospective buyer.

In addition to the various options provided for ascertainment of quality the ability to select the type of auction itself is considered. It is first noted in connection with this aspect that either a prospective seller 66 or a prospective buyer 67 may initiate the auction of a specified lot with a new listing 13 presenting an open offer 16 or open bid 17 beginning with the same proposal format 29 in which offer or bid must be specified. As a matter of practice the type of auction available is related to this fundamental. Theoretically any auction is governed by several readily defined parameters: (a) direction, either upward or downward; (b) amount, open or incremental; and (c) duration, open or constrained, which present eight different cases which may further be viewed as sixteen different cases depending upon whether the initiator is a prospective seller 66 making an open offer 16 or a prospective buyer 67 making an open bid 17.

In practice it makes little sense for bidding on an open offer 16 to be downward and open with respect to amount and duration though incremental decrease in pricing constrained by a minimum acceptable bid is considered a practical case. In corollary, it makes little sense for offering on an open bid 17 to be upward and open with respect to amount and duration though incremental increase in pricing constrained by a maximum acceptable offer is considered a practical case. Upward, constrained bidding and downward, constrained offering are also considered nonsensical which leaves six practical options as summarized in Table 1 below:

TABLE 1

Basic Auction Types

| Open Offer | Open Bid |
|---|---|
| Upward, Open, Unconstrained Bidding | Downward, Open, Unconstrained Offering |
| Upward, Incremental, Unconstrained Bidding | Downward, Incremental, Unconstrained Offering |
| Downward, Incremental, Constrained Bidding | Upward, Incremental, Constrained Offering |

This discussion recognizes variation of only one parameter: price 39 with respect to time. The price 39 may go up or down, the amount by which it proceeds may be open or incremental, and a minimum or maximum price 39 imposed or not. It is assumed that all other parameters are constant. In a preferred embodiment in accordance with the principles relating to the present invention other auction parameters may also be varied including: quantity 31 or size of the lot; delivery terms 32; payment terms 33; and quality specification 35. The type of auction conducted is considered to be either basic, i.e. uniparameter, or complex, i.e. multiparameter, depending upon whether price 39 with respect to time is the only parameter which is variable or not. As demonstrated below in discussion of an example represented in FIGS. 7-11 a complex or multiparameter auction not only enables more than one auction parameter, i.e. price 39, to be varied but also enables price 39 as a function of time to vary upward or downward. Negotiation is further facilitated by offer and bid indications 36, 37 which essentially comprise secondary choices with regard to the primary position for each parameter, i.e. group of terms 30 that is variable.

In general, at least two options are recognized for each of the auction parameters which may be varied. The delivery date can be advanced or retarded, the quantity 31 decreased or increased, and delivery terms 32 may be varied with respect to how and where. Payment terms 33 can include: (a) letter of credit; (b) payment×days after invoice; (c) payment×days after delivery; (d) cash upon delivery; (e) cash against documents, i.e. title; and letter of credit×days after delivery. And quality specification 35 may be varied with respect to what is desired and how it is ascertained which is facilitated by the optional use of samples 56 and its converse, models 57, which are examples provided by the initiator of an open bid 17. Parties making an open offer 16 or counter offer 26 may provide a sample 56. In the case that the auction of given lot is initiated by an open offer 16 no models 57 are anticipated. If, however, the auction is initiated by an open bid 17 models 57 may be provided and/or samples 56 requested.

It is further considered necessary that an auction house 60 facilitating flexible term online trading of commodities receive all samples 56, evaluate the same, and/or forward actual samples 56 to the prospective buyers 67. A sample 56 provided by the prospective seller 66 may simply be evaluated, preferably by an independent laboratory 61, and the test results 59 provided as data by the auction house 60 online to the prospective buyers 67 and other registrants 63. If, alternatively, samples 56 are to be provided to the prospective buyers 67 it is considered that the auction house 60 has two options regarding distribution. Either one sample 56 provided by the prospective seller 66 is divided up, proportionally, between the prospective buyers 67 or a discrete number of samples 56 is provided to the auction house 60 and distributed to prospective buyers 67 after being 'esteemed' i.e. evaluated as possessing substantially uniform quality. Esteemed or proportional distribution of the samples 56 to the prospective buyers 67 by the auction house 60 provides a warranty regarding authenticity further supported or supplanted by test results 59 from an independent laboratory 61. The provision of samples 56 or models 57 between parties is preferably conducted by utilization of conventional, commercial transport 62 as depicted in FIG. 6.

In consideration of the options available, two basic cases are recognized, open offer 16 or open bid 17. The first does not admit of models 57 and is hence simpler. Either a sample 56 is provided or not. If so it may be for testing only. Or it may be made available to prospective buyers 67 in which case the sample 56 provided by the prospective seller 66 is either esteemed or proportionally distributed. In either case testing may also be provided by the auction house with results posted in the listing 13 and/or provided to registrants. Table 2 below summarizes the six different options in this case as read along the bottom line.

TABLE 2

Sample Options in an Open Offer

| Sample? Available? | Yes Yes | | Yes No, Testing Only | | No |
|---|---|---|---|---|---|
| Distribution? | Esteemed | | Proportional | | |
| Testing Also? | Yes | No | Yes | No | Testing Only | No Sample |

In the case of an open bid 17 wherein a model 57 may also be provided the number of options, increases to nine as seen in Table 3 below. The model 57 provided is handled in a similar manner as the sample 56 as it may be esteemed or proportionally distributed but testing of a model 57 is not considered useful. Testing of samples 57 may be provided if required or the samples 56 forwarded to the bidder, i.e. a prospective buyer 67, which leaves three final options independently of the options regarding a model 57.

TABLE 3

Model & Sample Options in an Open Bid

| Model? | Yes | | | | No | |
|---|---|---|---|---|---|---|
| Distribution? | Esteemed | | Proportional | | None | |
| Sample? | Yes | No | Yes | No | Yes | No |
| To Bidder? | Yes | Test Only | No | Yes | Test Only | No | Yes | Test Only | No |

In combination of the two basic options, bid 16 or offer 17, a total of fifteen options are recognized:

1. Open Offer; Sample Provided; Sample Available; Esteemed Distribution, With Testing.
2. Open Offer; Sample Provided; Sample Available; Esteemed Distribution, No Testing.
3. Open Offer; Sample Provided; Sample Available; Proportional Distribution, No Testing.
4. Open Offer; Sample Provided; Sample Available; Proportional Distribution, With Testing.
5. Open Offer; Sample Provided for Testing Only.
6. Open Offer; No Sample.
7. Open Bid; Model Provided; Esteemed Distribution; Sample Required, Sample Provided to Bidder.
8. Open Bid; Model Provided; Esteemed Distribution; Sample Required, Sample Tested.
9. Open Bid; Model Provided; Esteemed Distribution; Sample Not Required.

10. Open Bid; Model Provided; Proportional Distribution; Sample Required, Sample Provided to Bidder.
11. Open Bid; Model Provided; Proportional Distribution; Sample Required, Sample Tested.
12. Open Bid; Model Provided; Proportional Distribution; Sample Not Required.
13. Open Bid; No Model Provided; Sample Required; Sample Provided to Bidder.
14. Open Bid; No Model Provided; Sample Required; Sample Tested.
15. Open Bid; No Model Provided; Sample Not Required.

A major portion of the significance of this exercise in delineating the various options available regarding the provision of samples 56 and/or models 57 with or without testing is its basis for the development of scheduling 50 which is effected with the use of schedule dates 51 including commencement 52, conclusion 53 and model and sample dates 55, as depicted in FIG. 7, for the actions which will govern the auction. Simply put, the more actions included, the more complex becomes the scheduling 50. The most complex scheduling 50 will be for an open bid 17 in which a model 57 is provided, samples 56 are required, and testing by an independent laboratory 61 for the posting of test results 59 is further utilized. A delay must be recognized for:

(a) provision of the model 57 by the prospective buyer 67 to the auction house 60;
(b) provision of the model 57 by the auction house 60 to the prospective sellers 66;
(c) provision of a sample 56 by the prospective sellers 66 to the auction house 60;
(d) provision of the samples 56 by the auction house 60 to the prospective buyer 67 and/or to a laboratory 61 for testing.

The simplest scheduling 50 is for an open offer 16 in which no sample 56 is provided or an open bid 17 in which no model 57 is provided and no sample 56 is requested. All the other cases are of intermediate complexity with regard to scheduling 50.

The system, i.e. business method or arrangement, facilitating online auction preferably determines scheduling 50 based upon the options chosen by the initiator of the open offer 16 or open bid 17 and the number of respondents to the same whereby scheduling 50 becomes dynamic. If an open offer 16 or open bid 17 is met with zero response within a given time frame the auction might simply be cancelled as the number of respondents failed to meet a predetermined number required for proceeding. Alternatively, in an incremental price 39 auction the progressive increase in bidding, or the progressive decrease in offering price 39 might be accelerated by skipping one or more scheduled increments. If an open offer 16 provides samples 56 available to prospective buyers 67 but none are interested in receiving the same the auction might be cancelled. Similarly, if an open bid 17 provides a model 57 but no prospective sellers 66 express an interest in receiving the same within a given time frame the auction could be cancelled in consequence. A schedule date 51 is set for the conclusion of each step and pursuit of the next step is preferably dependent upon completion of the prior step, as determined by either a predetermined time or threshold response level.

Similarly, these deadlines or scheduling dates 51 may be advanced in consequence to prompt response from a sufficient number of prospective buyers 67 or sellers 66. In other words, rather than scheduling 50 in accordance with chronological thresholds dynamic scheduling 50 based upon strength of response is considered practical. It is hence suggested that threshold numbers reflecting the minimum or maximum response considered appropriate for commencing the next stage of the auction be set and used to trigger conclusion of one step and commencement of the next. It is also suggested that the provision of models 57 and/or samples 56, if utilized, be associated with these threshold numbers which may further be utilized as triggers for schedule dates 51 when met. A prospective buyer 67 can provide a model 57 in a fixed number of pieces and set a maximum period during which the models 57 are available. After receiving the fixed number of pieces of the model 57 the auction house 60 can put a listing 13 up offering the models 57 for the maximum period set along with the proviso that a fixed number of model 57 pieces are available and that the offer is terminated with exhaustion of those. Samples 56 being offered may be similarly handled as well as requests for samples 56.

Other auction parameters are also variable as discussed briefly above and in relation to detailed examples described below. In brief, however, any given proposal 23 must first be completed, including specification of all required parameters governing the scheduling 50 of the auction, and submitted to the auction house 60 facilitating flexible term online auctions of commodities preferably as discussed above: either by e-mail or other form of notification or in a visit to the web site 70 maintained by the auction house 60. From the submission of this proposal 23 to the conclusion of the auction of the specified lot it is preferred that the online auction house 60 control, through software maintaining the website 70 on a server computer 69 accessible through the interne 65, all information exchange between parties involved in a given online auction. And it is preferred that provision, through conventional means including service personnel and commercial transport 62, of all the models 57 and samples 56 involved be made by that auction house 60.

A listing 13 for a multiparameter auction of a specified lot is seen in FIG. 7 for an open bid 17 resulting from the completed proposal 23 depicted in FIG. 5, depicted as it might appear on the web site 70 represented in FIG. 6, or in e-mail notification of subscribers and/or registrants 63 preferably consisting of prospective sellers 66. The auction type is multiparameter, the specific commodity category 21 is scoured wool fleeces, and scheduling 50 inclusive of sample dates 55 for receiving and sending out samples 56, along with posting testing results 59, commencement 52 and conclusion 53 of the auction are all seen in an upper portion of the listing 13. In the lower portion of the listing 13 the quantity 31 desired is seen to be 14,000 kg, a quality specification 35 is given by a desired origin in Australia, a fineness of 22 microns, no more than 0.3 percent vegetal matter and a fiber length distribution as represented in an attachment which conveys graphic material. Delivery terms 32 are seen to specify free port, a delivery date, and location while desired payment terms 33 are seen to be 90 days from invoice at a price 39 of 3.2 Euros per kilogram. A last update time is further given toward the bottom and the current time may also be added. It is further suggested that time be expressed in Greenwich Mean Time (GMT) for sake of simplicity in international commerce.

In FIG. 8 this open bid 17 is seen to have been responded to by two counter offers 26 which vary from the desired terms 30 in a plurality of areas: the quality specification 35, the payment terms 33 and the quantity 31. A second counter offer 26 is offering a greater quantity 31, 20,000 kg, which is of a lesser quality specification 35 in being coarser and having more vegetal matter than desired by the open bid 17, at a lower price 39, i.e. 3.1 euros/kg but requesting letter of credit in the payment terms 33. A first counter offer 26 is seen to match more closely the terms 30 desired as the quantity 31 is the same and the quality specification 35 is met but the payment terms 33 specify a price 39 of 3.4 euros/kg due 30 days from invoice instead of 3.2 euros/kg and 90 days specified by the open bid 17.

In FIG. 9 the prospective buyer is seen to have responded to the two counter offers 26 with a bid indication 37 regarding payment terms 33. 3.35 euros/kg is indicated as acceptable rather than the 3.4 euros/kg of the first counter offer 26 while a counter bid 27 of 2.95 euros/kg is indicated as acceptable rather than the 3.1 euros/kg of the second counter offer 26. Furthermore, rather than a letter of credit proposed by the second counter offer 26 cash on delivery is indicated as acceptable and 60 days from invoice date is indicated as acceptable rather than the 30 days requested by the first counter offer 26.

It is noted that in the case of an open offer 16 counter bids 27 are made in response and offer indications 36 can be made by the prospective seller 36. Whether initially made, or made in response to the initial offer or bid, or made in response to that response, an offer is an offer and a bid is a bid. An initial bid is known herein as an open bid 17 as an initial offer is known as an open offer 16. Similarly the responses made by prospective sellers 66 or prospective buyers 67, respectively, in offering and bidding on the open bid 17 or the open offer 16 are known herein as counter offers 26 and counter bids 27. And responses to these counter offers 26 and counter bids 27 by the party initiating the auction with a listing 13 are known as bid indications 37 and offer indications 36.

These bid indications 37 are seen in FIG. 10 to have been responded to with modification of the payment terms 33 contained in the second counter offer 26 with a decrease from 3.1 to 3 euros/kg while the first counter offer 26 has remained static but the bid indication 37 represents a compromise in payment terms 33 by indicating that 45 days from invoice date would be acceptable rather than the 60 days previously requested.

Selection of the first counter bid 26, and agreement to the terms 30 depicted therein by underlining is seen in FIG. 11 which signifies the conclusion of this online auction of the specified lot of 14,000 kg of scoured wool fleeces having the quality specification 35 initially desired at a price 39 of 3.35 euros/kg due 30 days from the invoice date, compared with the 45 days indicated previously, which constitute the payment terms 33 negotiated online by use of counter offers 26 and bid indications 37.

Most significantly perhaps, with regard to a preferred embodiment of the principles relating to the present invention, the example detailed above with reference to FIGS. 7-11 illustrates the flexibility in terms 30 enabled. Payment terms 33 including price 39 and due date were negotiated in selecting a winning offer while quantity 31 and quality 35 as well as payment terms 33 were negotiated in the second counter offer 26. Delivery terms 32 were not negotiated as both counter bids 26 tacitly accepted free port delivery in London by the date requested.

The price 39 negotiated, moreover, reflected use of both upward and downward offering in response to the initial open bid 17. By allowing variation in other auction parameters including quality specification 35, payment terms 33, and quantity 31 the fundamental nature of the auction is considered to have been affected as both directions of price 39 as a function of time are enabled. The fundamental auction types discussed above in relation to Table 1 are hence seen to be broadened in an unexpected manner. And while each fundamental auction type described therein is considered applicable, if desired, in defining a uniparameter type auction a multiparameter auction in accordance with a preferred embodiment of the principles relating to the present invention is considered to be inherently unrestricted by these fundamental auction types.

An example of a uniparameter online auction in accordance with the principles relating to the present invention is represented in FIG. 13 wherein a listing 13 resulting from the proposal 23 depicted in FIG. 12, by a prospective seller 66 for a lot of a quantity 31 specified as 14,000 kg of a specified commodity category 21 of scoured wool fleeces is offered in a uniparameter progressive decrease auction with an initial offer price 39 of 3.6 euros/kg. A quality specification 35 of 0.3% vegetal matter, 22 micron fineness, origin Australia, is given along with delivery terms 32 specifying delivery in London as a free port on Nov. 30, 2001 and in addition to the price 39, which as a function of time is the only variable in the auction, the payment terms 33 being specified as cash on delivery. It is further seen that requests for samples 56 must be received by Nov. 10, 2001 which will be available along with test results 59 from an independent laboratory 61 on Nov. 15, 2001, and that, in addition to these schedule dates 51 scheduling 50 further includes a commencement date 52 of Nov. 20, 2001, 13:00 GMT and a completion date of Nov. 20, 2001, exact time unspecified as is the minimum acceptable price 39.

It is understood that in a progressive decrease open offer 16 must be a minimum acceptable price 39, for the same reason there is a maximum acceptable price 39 for a progressive increase open bid 17, as discussed earlier in relation to the fundamental auction types of Table 1. A maximum price 39 on a progressive or open increase open offer 16 and a minimum price 39 on a open bid 17 have similarly been considered to be nonsensical and the six fundamental types of auction set forth in Table 1 above are considered to comprise the most practical for a uniparameter auction in which price 39 as a function of time is the only variable. In a progressive decrease open offer 16 or a progressive increase open bid 17 the minimum and maximum prices 39 are preferable undisclosed in the listing 13 but this need not be the case and, while not depicted in the figures attached hereto, it may be considered desirable to make these constraints known to the participants.

It is noted in connection with the open offer 16 depicted in FIG. 13 that an auction resulting therefrom is considered exemplary of the constraints imposed by selection of a uniparameter auction which may be any of the six fundamental types defined above in relation to Table 1. To with, both samples 56 and models 57 are available options as is the posting of test results 59. The scheduling 50 is, as discussed earlier, determined by the inclusion of these options along with other information provided by the initiator of the listing 13 including the delivery date which provides an outer boundary to the completion date 53. The commencement date 52 is bounded on the inside by the availability of samples 56, if available or required, and/or the posting date of the test results 59. The availability date of models may also constrict the commencement date 52 which is otherwise limited by the submission date of the proposal 23 at minimum.

Finally, with regard to the scheduling 50 of the auction of the lot of scoured wool fleeces depicted in FIG. 13, it is noted that a progressive decrease auction, or a progressive increase auction, utilizes incremental decrease or increase in price 39 as a function, preferably of time and further preferably as a linear function of time though dynamic scheduling 50 as previously discussed above is also considered suitable. In the preferred uniparameter auction resulting a progressive incremental decrease in price 39 as a linear function of time of, for example, 0.005 euros/kg every five minutes might be specified beginning from the initial price 39 of 3.600 euros/kg. The auction is concluded by a prospective buyer 66 placing a bid upon the lot at any time or reaching the minimum acceptable price 39, posted or not, before a bid is placed. If, after fifty minutes, no bid has been placed the price 39 will be 3.35 euros/kg. After another fifty minutes, if no bid has been placed, the price 39 will be 3.1 euros/kg. which is approximately what might be anticipated as a minimum acceptable price 39 for the lot 15.

It is emphasized that the foregoing is intended to provide one practiced in the art with what is considered the best known manner of effecting and utilizing a preferred embodiment of the principles relating to the present invention and is not to be construed in any manner as restrictive of said invention or the rights and privileges obtained by Letters Patent for the same and for which I claim:

1. A method enabling flexible terms commodities trading by auction comprising the steps of:
    providing, upon a web site accessible upon the world wide web, a proposal format in which the type of auction can be specified in addition to the particular commodity, weight, price, and specific commodity category dependent quality characteristics desired by a prospective buyer in completion of a submission for initiating an open bid;
    providing the option of provision of a model of a particular commodity desired for purposes of indicating the quality desired by a prospective buyer;
    providing, upon a web site accessible upon the world wide web, a proposal format in which the type of auction can be specified in addition to the particular commodity, weight, price, and specific commodity category dependent quality characteristics offered by a prospective seller in completion of a submission for initiating an open offer;
    providing the option of provision of a sample of a particular commodity offered for purposes of indicating the quality offered by a prospective seller;
    conducting a commodities auction by:
    posting upon said web site a listing for a specified lot of a particular commodity in accordance with a completed proposal submission detailing a plurality of terms including weight, price, quality characteristics, delivery and payment comprising an open offer of said specified lot when initiated by a prospective seller and comprising an open bid of said specified lot when initiated by a prospective buyer;
    scheduling said auction of said specified lot by posting a plurality of schedule dates including but not restricted to commencement and conclusion dates between which responses to said listing will be received;
    posting upon said web site, in association with said listing, counter bids received in response to an open offer and counter offers received in response to an open bid which vary in any of the terms included in said plurality of terms detailed in said listing;
    posting upon said web site, in association with said listing, any offer indications by said prospective seller in response to posted counter bids and any bid indications by said prospective buyer in response to posted counter offers signifying a modification of at least one term in said listing;
    indicating upon said web site, in association with said listing, sale of said lot with the matching in all said terms inclusive of delivery and payment between any offer and any bid both concerned with said specified lot in accordance with said terms.

2. The business method of claim 1 further including the step of depositing, upon said web site, said listing following sale of said lot with indication of the matching in all said terms between any offer and any bid both concerned with said specified lot.

3. The business method of claim 1 wherein said web site providing said proposal format in which the type of auction can be specified by a prospective buyer in completion of a submission for initiating an open bid is different than said web site providing said proposal format in which the type of auction can be specified by a prospective seller in completion of a submission for initiating an open offer.

4. The business method of claim 1 wherein said web site providing said proposal format in which the type of auction can be specified by a prospective buyer in completion of a submission for initiating an open bid is the same as said web site providing said proposal format in which the type of auction can be specified by a prospective seller in completion of a submission for initiating an open offer.

5. The business method of claim 1 further including the step of providing notification to subscribers of listings identified by commodity category as being of interest to said subscribers.

6. The business method of claim 5 wherein said notification is provided by electronic means inclusive of e-mail.

7. The business method of claim 1 wherein said web site providing said proposal format in which the type of auction can be specified by a prospective buyer in completion of a submission for initiating an open bid provides registration access means for registration of said prospective buyer with an auction house maintaining said web site.

8. The business method of claim 7 wherein registration of said prospective buyer requires payment of a fee to said auction house by said prospective buyer.

9. The business method of claim 1 wherein said web site providing said proposal format in which the type of auction can be specified by a prospective seller in completion of a submission for initiating an open offer provides registration access means for registration of said prospective seller with an auction house maintaining said web site.

10. The business method of claim 9 wherein registration of said prospective seller requires payment of a fee to said auction house by said prospective seller.

11. The business method of claim 1 wherein said web site providing said proposal format in which the type of auction can be specified by a prospective buyer in completion of a submission for initiating an open bid provides directory access means for accessing a directory comprised of a plurality of commodity categories.

12. The business method of claim 11 wherein an auction house maintaining said web site provides listings pertaining to a particular commodity category chosen from said plurality of commodity categories to said prospective buyer by subscription.

13. The business method of claim 11 wherein said subscription requires payment of a fee by said prospective buyer to an auction house providing said listings.

14. The business method of claim 1 wherein said prospective seller, in specification of the type of auction, is presented with a choice to select upward, open, unconstrained bidding wherein said listing specifies an initial minimum price and bidding within the time between said commencement and conclusion dates is otherwise unconstrained with regard to price.

15. The business method of claim 1 wherein said prospective seller, in specification of the type of auction, is presented with a choice to select upward, incremental, unconstrained bidding wherein said listing specifies an initial minimum price and bidding within the time between said commencement and conclusion dates is otherwise only constrained with regard to price by the progressive increase of the same in predetermined increments.

16. The business method of claim 15 wherein said predetermined increments constraining said progressive increase of price are a function of time.

17. The business method of claim 15 wherein said predetermined increments constraining said progressive increase of price are a function of the number or responses received.

18. The business method of claim 1 wherein said prospective seller, in specification of the type of auction, is presented with a choice to select downward, incremental, constrained bidding wherein said listing specifies an initial maximum price and bidding within the time between said commencement and conclusion dates is constrained with regard to price by the progressive decrease of the same in predetermined increments and by a predetermined minimum price which is not posted in said listing.

19. The business method of claim 18 wherein said predetermined increments constraining said progressive decrease of price are a function of time.

20. The business method of claim 1 wherein said prospective buyer, in specification of the type of auction, is presented with a choice to select downward, open, unconstrained offering wherein said listing specifies an initial maximum price and offering within the time between said commencement and conclusion dates is otherwise unconstrained with regard to price.

21. The business method of claim 1 wherein said prospective buyer, in specification of the type of auction, is presented with a choice to select downward, incremental, unconstrained offering wherein said listing specifies an initial maximum price and offering within the time between said commencement and conclusion dates is otherwise unconstrained with regard to price by the progressive decrease of the same in predetermined increments.

22. The business method of claim 21 wherein said predetermined increments constraining said progressive decrease of price are a function of time.

23. The business method of claim 21 wherein said predetermined increments constraining said progressive decreas of price are a function of the number of responses received.

24. The business method of claim 1 wherein said prospective buyer, in specification of the type of auction, is presented with a choice to select upward, incremental, constrained bidding wherein said listing specifies an initial minimum price and offering within the time between said commencement and conclusion dates is constrained with regard to price by the progressive increase of the same in predetermined increments and by a predetermined maximum price which is not pOsted in said listing.

25. The business method of claim 24 wherein said predetermined increments constraining said progressive increase of price are a function of time.

26. The business method of claim 1 wherein said model of a particular commodity is provided by said prospective buyer directly to prospective sellers.

27. The business method of claim 1 wherein said model of a particular commodity is provided by said prospective buyer to an auction house maintaining said web site.

28. The business method of claim 27 wherein said model of a particular commodity provided by said prospective buyer to said auction house is tested by a laboratory and testing results are posted on said web site in association with said listing.

29. The business method of claim 27 wherein said model of a particular commodity provided by said prospective buyer to said auction house is provided to prospective sellers by said auction house.

30. The business method of claim 29 wherein said model of a particular commodity provided by said prospective buyer to said auction house is divided proportionally by said auction house in accordance with a number of prospective sellers each of whom is provided with a proportion of said model by said auction house.

31. The business method of claim 29 wherein said model of a particular commodity provided by said prospective buyer to said auction house is comprised of a discrete number of pieces each esteemed by said auction house to possess substantially equivalent quality and prospective sellers are each provided with one said piece of said model by said auction house.

32. The business method of claim 1 wherein said sample of a particular commodity is provided by said prospective seller directly to prospective buyers.

33. The business method of claim 1 wherein said sample of a particular commodity is provided by said prospective seller to an auction house maintaining said web site.

34. The business method of claim 33 wherein said sample of a particular commodity provided by said prospective seller to said auction house is tested by a laboratory and testing results are posted on said web site in association with said listing.

35. The business method of claim 33 wherein said sample of a particular commodity provided by said prospective seller to said auction house is provided to prospective buyers by said auction house.

36. The business method of claim 35 wherein said sample of a particular commodity provided by said prospective seller to said auction house is divided proportionally by said auction house in accordance with a number of prospective buyers each of whom is provided with a proportion of said sample by said auction house.

37. The business method of claim 35 wherein said sample of a particular commodity provided by said prospective seller to said auction house is comprised of a discrete number of pieces each esteemed by said auction house to possess substantially equivalent quality and prospective buyers are each provided with one said piece of said sample by said auction house.

\* \* \* \* \*